US 8,886,378 B2

(12) United States Patent
Hammer et al.

(10) Patent No.: US 8,886,378 B2
(45) Date of Patent: Nov. 11, 2014

(54) SYSTEM AND METHOD FOR MONITORING STATE OF FUNCTION OF A MATERIALS HANDLING VEHICLE

(71) Applicants: Joe K. Hammer, St. Marys, OH (US); Michael P. Kovach, Celina, OH (US); Ronald L. Ziegler, Celina, OH (US)

(72) Inventors: Joe K. Hammer, St. Marys, OH (US); Michael P. Kovach, Celina, OH (US); Ronald L. Ziegler, Celina, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 13/747,645

(22) Filed: Jan. 23, 2013

(65) Prior Publication Data
US 2013/0190959 A1 Jul. 25, 2013

Related U.S. Application Data

(60) Provisional application No. 61/590,416, filed on Jan. 25, 2012.

(51) Int. Cl.
*G01M 17/007* (2006.01)
*G06F 19/00* (2011.01)
(52) U.S. Cl.
USPC .................................. 701/22; 701/50; 701/43
(58) Field of Classification Search
USPC ......... 701/22, 50, 141, 42, 43, 31.6; 303/189, 303/89; 180/242
See application file for complete search history.

(56) References Cited

U.S. PATENT DOCUMENTS

| 4,126,237 | A  | * | 11/1978 | Downing et al. ............. 414/636 |
| 5,499,866 | A  |   | 3/1996  | Brugger et al. |
| 5,579,227 | A  | * | 11/1996 | Simmons et al. ............ 701/31.6 |
| 6,158,822 | A  |   | 12/2000 | Shirai et al. |
| 6,354,392 | B1 | * | 3/2002  | Cousin et al. ................ 180/242 |
| 7,748,793 | B2 |   | 7/2010  | Hartmann et al. |
| 8,311,699 | B2 |   | 11/2012 | Brown et al. |

(Continued)

FOREIGN PATENT DOCUMENTS

| DE | 10021601 A1 | 11/2001 |
| DE | 10139102 A1 | 3/2003 |

(Continued)

OTHER PUBLICATIONS

Meritano, Luciano; International Search Report; International Application No. PCT/US2013/022676; May 14, 2013; European Patent Office.

*Primary Examiner* — Tan Q Nguyen
(74) *Attorney, Agent, or Firm* — Stevens & Showalter LLP

(57) ABSTRACT

A plurality of industrial vehicle operating parameters are observed and evaluated to monitor drivetrain(s) of the vehicle to determine whether a traction motor has become decoupled from its drivetrain, i.e., a dynamic gearbox failure. If a dynamic gearbox failure is detected, a static test is performed while the vehicle is stopped to confirm the failure. Drive capabilities of the vehicle are restricted if the dynamic gearbox failure is confirmed by the static test while full drive capabilities are enabled if not. A parking brake test is performed by applying each mechanical brake that is attached to a traction motor or a driving wheel and then individually controlling the traction motors in accordance with an operator's travel request such that each motor produces enough torque to rotate the motor if the brake its respective drive wheel is functionally degraded. The torque is applied in the direction of the operator's travel request so that any movement of the vehicle due to inadequate mechanical braking will not be unexpected by the operator.

36 Claims, 10 Drawing Sheets

(56) References Cited

U.S. PATENT DOCUMENTS

| | | | |
|---|---|---|---|
| 2002/0049524 A1* | 4/2002 | Wager et al. | 701/41 |
| 2006/0273656 A1* | 12/2006 | Sherman et al. | 303/89 |
| 2011/0144855 A1 | 6/2011 | Herges et al. | |
| 2012/0221195 A1 | 8/2012 | Eliasson | |
| 2012/0226420 A1 | 9/2012 | Bauer et al. | |
| 2013/0066532 A1 | 3/2013 | Brown et al. | |

FOREIGN PATENT DOCUMENTS

| | | |
|---|---|---|
| DE | 10230007 A1 | 1/2004 |
| DE | 102010003325 A1 | 10/2010 |
| EP | 0688977 A2 | 12/1995 |
| EP | 0937618 A2 | 8/1999 |
| EP | 1967769 A1 | 9/2008 |
| WO | 03100282 A1 | 12/2003 |
| WO | 2010123412 A1 | 10/2010 |

* cited by examiner

SYSTEM AND METHOD FOR MONITORING STATE OF FUNCTION OF A MATERIALS HANDLING VEHICLE

CROSS REFERENCE TO RELATED APPLICATION

This application claims the benefit of U.S. Provisional Patent Application Ser. No. 61/590,416, filed Jan. 25, 2012 entitled "SYSTEM AND METHOD FOR MONITORING STATE OF FUNCTION OF A MATERIALS HANDLING VEHICLE", the disclosure of which is hereby incorporated by reference herein.

FIELD OF THE INVENTION

The present invention relates generally to materials handling vehicles, and more particularly, to a system for monitoring their state of function.

BACKGROUND OF THE INVENTION

Materials handling vehicles commonly include braking systems which combine regenerative braking using the vehicle traction motor, which may be referred to as plugging, with mechanical brakes. Since regenerative braking conserves battery charge and is not subject to wear as are mechanical brakes, it is desirable to use the electric motor for as much of the normal service braking requirements as possible. Provided the traction motor has sufficient capacity, substantially all service braking can be done using the traction motor with the mechanical brakes being used only for parking and backup braking which may be required during unusual operating circumstances such as use of the vehicles on excessive grades and/or with inadvertently excessive loads.

In instances where the vehicle's primary form of braking is regenerative braking or its construction is such that a mechanical brake is separated from the wheel-end of the drivetrain, a series of mechanical interconnecting joints are used to transmit tractive and braking forces to the wheels of the vehicle. If critical ones of these interconnecting mechanical components become loose or structurally fail, braking and handling characteristics of the vehicle can be adversely affected.

SUMMARY OF THE INVENTION

Embodiments of the present invention relate to systems and methods for dynamically monitoring the state of function of one or more drivetrains of an industrial vehicle. Dynamic monitoring includes observing a plurality of industrial vehicle operating parameters and analyzing those parameters to determine whether or not a mechanical failure has or may have occurred resulting in a traction motor and possibly a mechanical brake being decoupled from a wheel. Upon dynamic detection of a possible mechanical failure, a static test is performed on the industrial vehicle while the vehicle is stopped to verify the accuracy of the dynamic detection. Based on results of the static test, it is determined whether a mechanical failure has actually occurred or not. If a mechanical failure is confirmed, the operability of the industrial vehicle is restricted. If a mechanical failure is not confirmed, full operability of the industrial vehicle is enabled.

In accordance with a first aspect of the present invention, a method of dynamically monitoring one or more drivetrains of an industrial vehicle is provided. The method may comprise: observing a plurality of operating parameters of the industrial vehicle while it is being operated; determining whether a drivetrain failure has occurred using the operating parameters; performing, if a drivetrain failure is detected, a static test on the industrial vehicle to confirm the dynamic drivetrain failure, the static test being performed while the industrial vehicle is not moving; based on results of the static test, determining either that a static test failure occurred or a static test failure has not occurred; and restricting drive capabilities of the industrial vehicle if the static test failure occurred.

Determining whether a drivetrain failure has occurred may comprise determining whether during a right turn a right traction motor is rotating faster than a left traction motor.

Determining whether a drivetrain failure has occurred may comprise determining whether during a left turn a left traction motor is rotating faster than a right traction motor.

Determining whether a drivetrain failure has occurred may comprise detecting whether a difference between a first current drawn by a left traction motor and a second current drawn by a right traction motor is greater than a predetermined threshold. The method may further comprise detecting that a steer angle is between about ±10°.

Determining whether a drivetrain failure has occurred may comprise: determining an expected speed of an inside traction motor based on a detected steer angle and a detected speed of an outside traction motor; and determining if an actual speed of the inside traction motor is greater than the expected speed.

Determining whether a drivetrain failure has occurred may comprise: identifying a speed limit for the industrial vehicle; and determining if a respective speed of either a right traction motor or a left traction motor exceeds the speed limit.

Determining whether a drivetrain failure has occurred may comprise: determining if a respective speed of one of a left or right traction motor is zero while the other of the right or left traction motor has a respective speed greater than zero.

Determining whether a drivetrain failure has occurred may comprise: determining if a respective acceleration rate of either a right traction motor or a left traction motor exceeds a predetermined threshold.

In accordance with a second aspect of the present invention, an industrial vehicle is provided comprising: a power unit; at least one drive wheel; at least one traction motor; at least one drivetrain between the at least one drive wheel and the at least one traction motor; at least one mechanical brake for transmitting braking forces to the at least one wheel; and a controller module. The controller module may execute program instructions to: observe a plurality of operating parameters of the industrial vehicle while it is being operated; determine whether a drivetrain failure has occurred using the operating parameters; perform, if a drivetrain failure is detected, a static test on the industrial vehicle to confirm the dynamic drivetrain failure, the static test being performed while the industrial vehicle is not moving;

based on results of the static test, determine either that a static test failure occurred or a static test failure has not occurred; and restrict drive capabilities of the industrial vehicle if the static test failure occurred.

The industrial vehicle may further comprise at least one feedback encoder to monitor the rotational speed of the at least one traction motor.

Determining whether a drivetrain failure has occurred may comprise determining whether during a right turn a right traction motor is rotating faster than a left traction motor.

Determining whether a drivetrain failure has occurred may comprise: determining an expected speed of an inside traction motor based on a detected steer angle and a detected speed of an outside traction motor; and determining if an actual speed of the inside traction motor is greater than the expected speed.

Determining whether a drivetrain failure has occurred may comprise: identifying a speed limit for the industrial vehicle; and determining if a speed of the at least one traction motor exceeds the speed limit.

Determining whether a drivetrain failure has occurred may comprise determining if a respective speed of one of a left or right traction motor is zero while the other of the right or left traction motor has a respective speed greater than zero.

Determining whether a drivetrain failure has occurred may comprise determining if a respective acceleration rate of either a right traction motor or a left traction motor exceeds a predetermined threshold.

In accordance with a third aspect of the present invention, a method of dynamically monitoring one or more drivetrains of an industrial vehicle is provided. The method may comprise: observing a plurality of operating parameters of the industrial vehicle while it is being operated; determining if a dynamic gearbox test failure has occurred based on one or more of the plurality of operating parameters; performing a static test on the industrial vehicle to confirm the dynamic gearbox test failure, the static test being performed while the industrial vehicle is not moving; based on results of the static test, determining either that a static test failure occurred or a static test failure has not occurred; and restricting drive capabilities of the industrial vehicle if the static test failure occurred.

Determining if a dynamic gearbox test failure has occurred may comprise determining if during a right turn a right traction motor is rotating faster than a left traction motor.

Determining if a dynamic gearbox test failure has occurred may comprise determining if during a left turn a left traction motor is rotating faster than a right traction motor.

Determining if a dynamic gearbox test failure has occurred may comprise detecting if a difference between a first current drawn by a left traction motor and a second current drawn by a right traction motor is greater than a predetermined threshold.

Determining if a dynamic gearbox test failure has occurred may comprise: determining an expected speed of an inside traction motor based on a detected steer angle and a detected speed of an outside traction motor; and determining if an actual speed of the inside traction motor is greater than the expected speed.

Determining if a dynamic gearbox test failure has occurred may comprise: identifying a speed limit for the industrial vehicle; and determining if a speed of the at least one traction motor exceeds the speed limit.

Determining if a dynamic gearbox test failure has occurred may comprise determining if a respective speed of one of a left or right traction motor is zero while the other of the right or left traction motor has a respective speed greater than zero.

Determining if a dynamic gearbox test failure has occurred may comprise determining if a respective acceleration rate of either a right traction motor or a left traction motor exceeds a predetermined threshold.

The static test may comprise: disengaging a first friction brake associated with the first traction motor; engaging a second friction brake associated with a second traction motor; energizing the first traction motor to produce a first torque at a first predetermined value, wherein the first torque is sufficient to rotate the first traction motor if the first traction motor is decoupled from the first gearbox; detecting if the first traction motor rotates as a result of the first torque; and determining the static test failure has occurred when rotation of the first traction motor occurs. The static test may further comprise: disengaging the second friction brake; engaging the first friction brake; energizing the second traction motor to produce a second torque at a second predetermined value, wherein the second torque is sufficient to rotate the second traction motor if the second traction motor is decoupled from a second gearbox; detecting if the second traction motor rotates as a result of the second torque; and determining the static test failure has occurred when rotation of the second traction motor occurs.

In accordance with a fourth aspect of the present invention, a method of dynamically monitoring one or more drivetrains of an industrial vehicle is provided. The method may comprise: observing a plurality of operating parameters of the industrial vehicle while it is being operated; and determining whether a drivetrain failure has occurred using the operating parameters.

Determining whether a drivetrain failure has occurred may comprise determining whether during a right turn a right traction motor is rotating faster than a left traction motor.

Determining whether a drivetrain failure has occurred may comprise determining whether during a left turn a left traction motor is rotating faster than a right traction motor.

Determining whether a drivetrain failure has occurred may comprise detecting whether a difference between a first current drawn by a left traction motor and a second current drawn by a right traction motor is greater than a predetermined threshold.

Determining whether a drivetrain failure has occurred may comprise: determining an expected speed of an inside traction motor based on a detected steer angle and a detected speed of an outside traction motor; and determining if an actual speed of the inside traction motor is greater than the expected speed.

Determining whether a drivetrain failure has occurred may comprise: identifying a speed limit for the industrial vehicle; and determining if a respective speed of either a right traction motor or a left traction motor exceeds the speed limit.

Determining whether a drivetrain failure has occurred may comprise determining if a respective speed of one of a left or right traction motor is zero while the other of the right or left traction motor has a respective speed greater than zero.

Determining whether a drivetrain failure has occurred may comprise determining if a respective acceleration rate of either a right traction motor or a left traction motor exceeds a predetermined threshold.

DETAILED DESCRIPTION OF THE INVENTION

Figure 1:
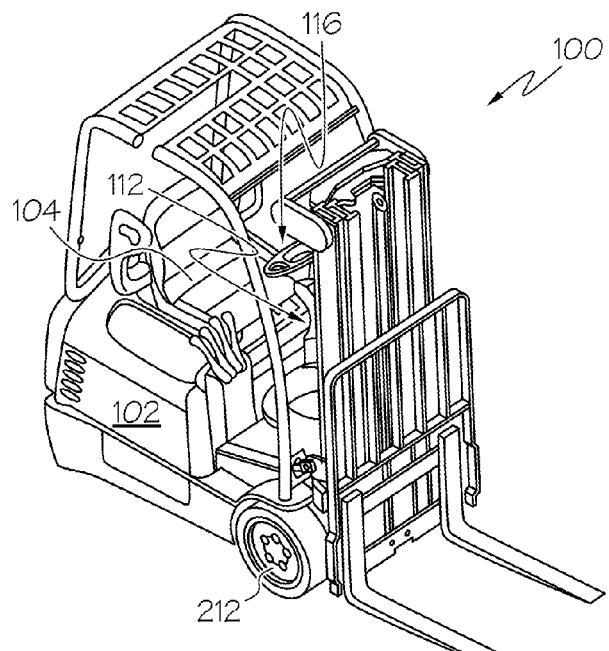
FIG. 1 is a perspective view of a materials handling vehicle illustrated as a sit-down counterbalanced lift truck operable in accordance with teachings of the present application.
Figure 2:
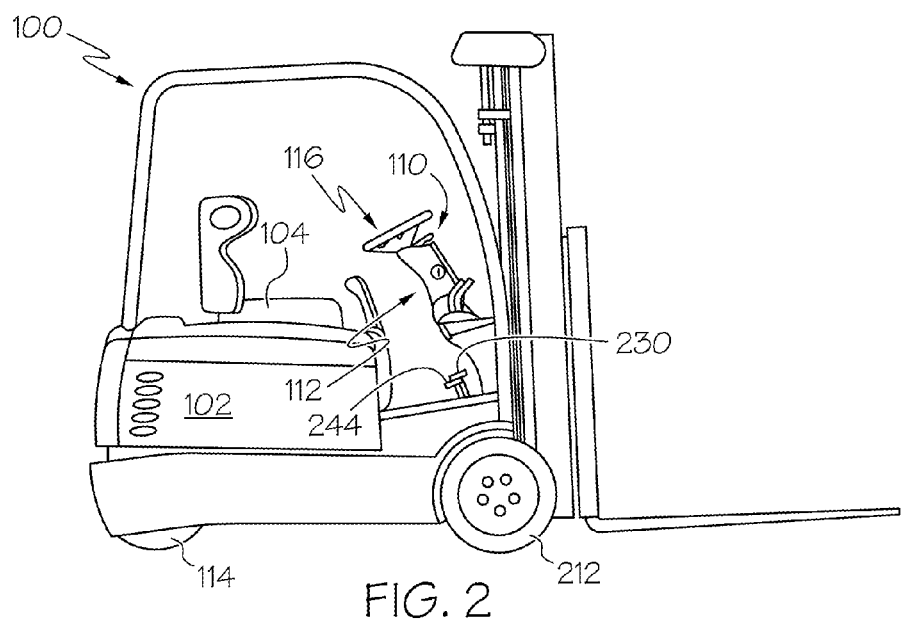
FIG. 2 is a side plan view of the counterbalanced lift truck of FIG. 1.
Figure 3:
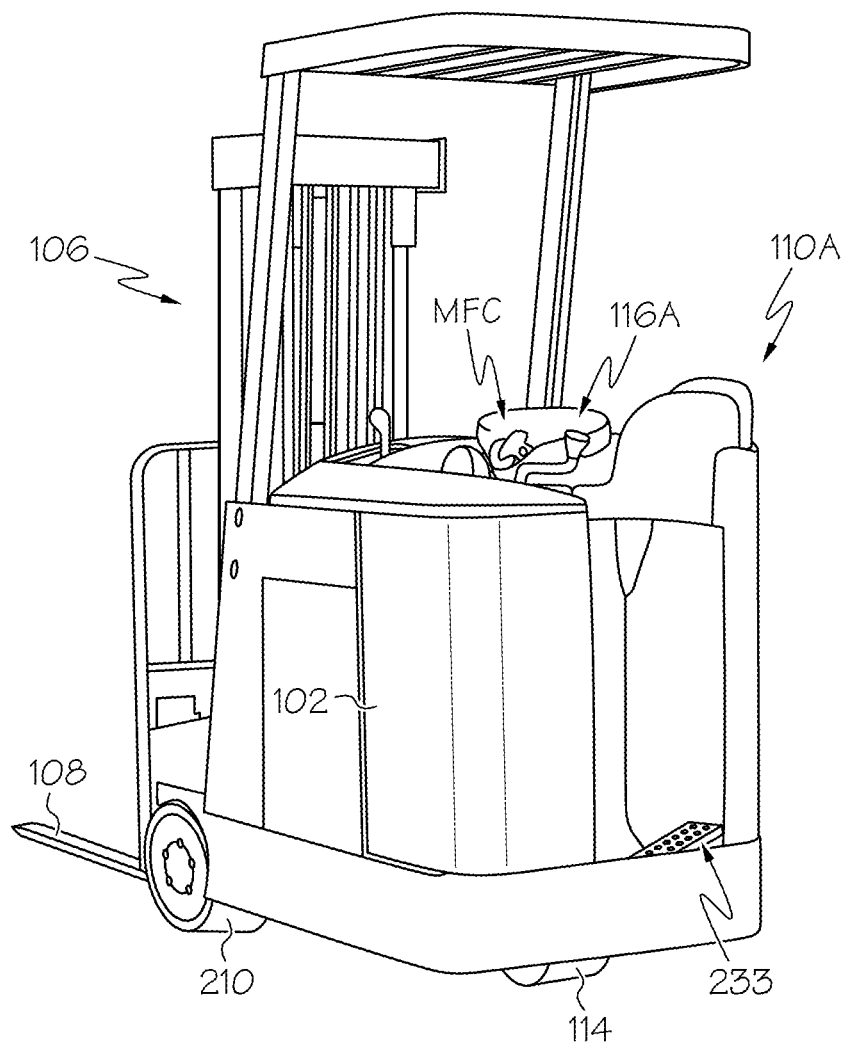
FIG. 3 is a perspective view of a standup counterbalanced lift truck operable in accordance with the teachings of the present application.

Reference is made to FIGS. 1 and 2 which are perspective and side plan views, respectively, of a three-wheel sit-down counterbalanced lift truck 100 for which the invention of the present application will initially be used. While the present invention may be described herein with reference to the sit-down counterbalanced lift truck 100, it will be apparent to those skilled in the art that the invention and variations of the invention can be more generally applied to a variety of other materials handling vehicles (also referred to herein as "industrial vehicles") including, without limitation, a three-wheel standup lift truck 100A shown in FIG. 3. Components that can be used to implement the invention of the present application on a vehicle 10, such as the lift trucks 100, 100A, are illustrated schematically in FIG. 5 and also are identified in FIGS. 1, 2 and 3 to the extent these components are visible in FIGS. 1, 2 and 3. It is contemplated that other components and component configurations can be used for the present invention so that the invention is not to be limited to these components or this configuration.

A closed loop dual traction motor controller 502, sometimes referred to as a traction control module (TCM) and located within a power unit 102 of the truck 10, 100, 100A, contains power electronics to control a left drive motor 512A and a right drive motor 512B independently of each other in both braking and motoring modes of operation. In a working embodiment of the invention, one of a number of commercially available controllers was used for the motor controller 502. The dual traction drive motors, i.e., the left drive motor 512A and the right drive motor 512B, are coupled to independent gearboxes 510A, 510B, respectively, to drive a left drive wheel 210, 508A and a right drive wheel 212, 508B, see FIGS. 1-3 and 5. In a working embodiment of the invention, the left and right drive motors 512A, 512B comprise three phase AC induction motors; however, the invention of the present application is not limited to AC motor technology as will be apparent to those skilled in the art. The invention of the present application can also be used for lift trucks that are driven by a single drive motor instead of dual drive motors and individual drive controllers can be used for the left and right drive motors 512A, 512B, if desired. For control of the drive motors 512A, 512B, independent feedback encoders 516A, 516B are used to monitor the rotational speed and direction of the drive motors 512A, 512B, respectively.

A mechanical, spring applied, electrically released first brake 514A is coupled to the left drive motor 512A to provide a percentage or fraction X of a total mechanical braking force 100% or 1 that is used for parking and backup braking of the truck 10, 100, 100A. While X can be within a range of fractions, 33% or ⅓ of the total mechanical braking force was used in a working embodiment of a truck including the described braking system. A mechanical, spring applied, electrically released second brake 514B is coupled to the right drive motor 512B to provide a fraction Y of the total mechanical braking force 1 that is used for parking and backup braking of the truck 10, 100, 100A. The fraction Y is complementary to the fraction X so that the total or 100% of the braking required for parking and backup purposes is provided when both of the brakes 516A, 516B are operated, i.e., X+Y=1. Since X was ⅓ in the working embodiment of the truck noted above, Y was ⅔. Other fractional divisions can be used with the selection of appropriate fractions being based, for example, on vehicle geometry and minimizing truck skewing. The spring applied, electrically released brakes can be more directly coupled to wheels mounted on opposite sides of a lift truck as would be required for example for a lift truck having a single drive motor.

A display control module (DCM) 506, that is independent of the traction motor controller 502, includes fail safe driver circuitry by providing power to the first brake 514A using a first pair of drivers (not shown) that are connected to the first brake 514A through a first pair of conductors C1 and providing power to the second brake 514B using a second pair of drivers (not shown) that are connected to the second brake 514B through a second pair of conductors C2. By providing pairs of drivers and conductors, i.e., separate control for each of the positive and negative power leads, if the control or conductor path for either polarity of power is interrupted, the corresponding mechanical brake cannot be electrically released through the interrupted control/power path and hence the associated brake will be applied by spring action.

The presence of an operator in a truck is detected by an operator attend or presence sensor 518. In the truck 100, the operator presence sensor 518 can be a conventional operator detector switch (not shown) that is actuated when an operator sits in a seat 104 of the truck 100 with the operator present signal generated by the switch being passed to the traction motor controller 502 and the display control module 506. Instead of using hard wiring to interconnect the traction motor controller 502 and the display control module 506, in vehicles utilizing a communications link 504 such as a Controller Area Network (CAN), the traction motor controller 502 and the display control module 506 can share common information via the communications link 504. In stand-up trucks, such as the truck 100A shown in FIG. 3, the operator presence sensor 518 can be a conventional switch (not shown) associated with a foot pedal 233 that must be engaged by the operator for truck operation. Other presence sensing arrangements and devices, such as Hall Effect devices, capacitance sensing devices, proximity detectors and the like, can also be used as an operator presence sensor. The display control module 506 can be constructed using a wide variety of electrical and/or electronic components as will be apparent to those skilled in the art from a review of this disclosure and therefore will not be described in detail herein.

Operator requests for service braking are generated by sensing devices (not shown) that are associated with a brake requesting device, such as a brake lever or a service brake pedal 230, 522, as illustrated. Depending upon lift truck design, the brake pedal can be pressed to request braking or released to request braking. For the sit-down counterbalanced lift truck 100, the brake pedal 230 is pressed to request braking while on stand-up lift trucks, such as the truck 100A of FIG. 3, the brake pedal is held down for operation of the truck and released to request braking. Analog devices, such as potentiometers, and digital devices, such as encoders, can be associated with the brake pedal 230, 522 to generate a signal that corresponds to or can be processed to correspond to the position of the brake pedal as will be apparent to those skilled in the art.

Figure 5:
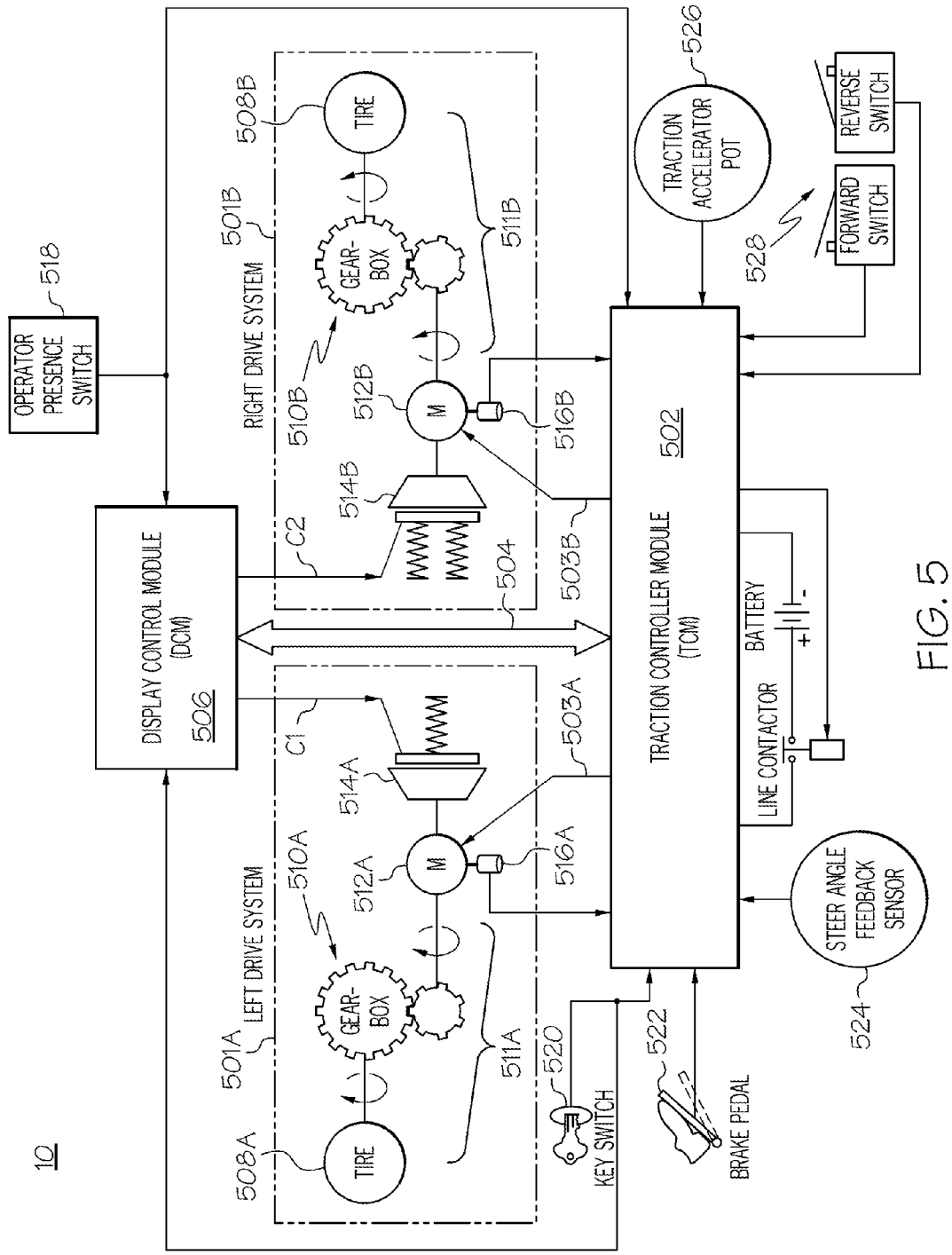
FIG. 5 is a schematic block level diagram of the components of a vehicle that provide diagnostic and monitoring systems and methods in accordance with principles of the present application.

An operator of the truck 100 can control truck speed using an accelerator that can be controlled by actions of the operator's feet or hands, depending on the truck design. In the truck 100, a foot operated accelerator 244 is used and an associated traction accelerator potentiometer 526 is illustrated in FIG. 5. The direction of the truck 100 is controlled using a forward switch and a reverse switch, both designated by 528 in FIG. 5, which can be operated using a lever 110 on the steering column 112, or otherwise, such as through a multifunction controller (MFC) as used on many lift trucks and illustrated in the truck 100A of FIG. 3. A steering angle sensor 524 is associated with a third wheel 114 in a known manner to detect the steering angle of the third wheel 114 that is controlled by rotation of the steering wheel 116 of the truck 100 or the tiller 116A of the truck 100A. A toggle or other appropriate device, illustrated as a key switch 520, must be operated to power up the truck 100, 100A for operation. For additional information regarding the described braking system reference can be made to U.S. Pat. No. 7,681,963 which is incorporated in its entirety in the present application by reference.

Figure 4A:
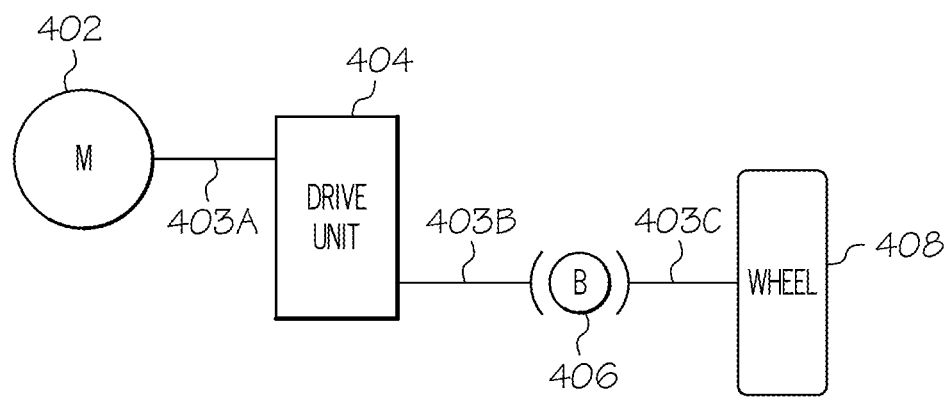
FIG. 4A is a block diagram of a wheel-end brake configuration.
Figure 4B:
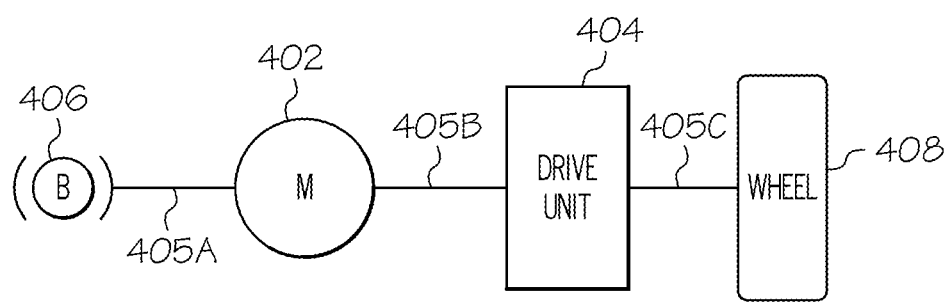
FIG. 4B is a block diagram of a motor-end brake configuration.

FIGS. 4A and 4B illustrate two brake configurations that may be used on materials handling vehicles. FIG. 4A is a wheel-end brake configuration having a motor 402, a drive unit 404, a mechanical brake 406, and a wheel 408 of the vehicle. While motive forces are transmitted to the wheel 408 through the drive unit 404 and the mechanical linkages 403A, 403B, 403C, braking forces are transmitted through the mechanical linkage 403C or, more commonly, the brake 406 is directly coupled to the wheel 408 so that no linkage is used to transmit the braking forces to the wheel 408. FIG. 4B illustrates a motor-end brake configuration that also includes a brake 406, motor 402, drive unit 404 and mechanical linkages 405A, 405B, 405C. It is thus apparent that problems in the drivetrain can result in problems both in traction and, of more concern, braking. Thus, being able to detect drivetrain mechanical integrity may help reduce the risk of unintentionally operating the vehicle in a defective state.

The diagnostic and monitoring systems and methods in accordance with the principles of the present application, as described more fully herein, can be implemented in either brake configuration to provide such detectability of the drivetrain mechanical integrity.

As described above, FIG. 5 is a block level diagram of the components of a vehicle 10, such as the lift trucks 100, 100A, that provide diagnostic and monitoring systems and methods in accordance with the principles of the present application. The traction controller module (TCM) 502 is a microprocessor, or microcontroller, or other similar device that can execute program instructions to provide various functionalities described more fully herein. The display control module (DCM) 506 is also a microprocessor based system for providing information to a driver of the vehicle 10 or receiving inputs from the driver, sensors and the like. The TCM and DCM can exchange information bi-directionally over the communications link 504. Other microprocessor-based and computing devices may be present on the vehicle 10 or in communication with the vehicle 10.

There are various controls that the vehicle 10 provides that involve interaction with an operator of the vehicle 10. For example, the key switch 520, the operator presence switch 518, the brake pedal 522, the traction acceleration potentiometer 526, and the motive controls providing either forward or reverse motion via the forward switch and the reverse switch 528.

With reference to a left drive system 501A, the TCM 502 provides a signal 503A to the left drive motor 512A. The signal 503A controls the speed at which the motor 512A rotates and determines whether the motor 512A is driving the vehicle 10 or providing regenerative braking. The mechanical brake 514A is coupled to the motor 512A to provide a braking force that opposes rotation of the motor 512A. The motor 512A is coupled to the drive wheel 508A through a system of mechanical linkages 511A including the gearbox 510A. The gearbox 510A can include rotating gears that intermesh to provide appropriate levels of torque and speed in order to drive the wheel 508A in a desired manner. The linkages 511A can also include shafts with splines and other features that allow force to be transmitted between the motor 512A and the wheel 508A. The motor 512A is coupled with a speed encoder 516A that detects the speed at which the motor 512A is operating. For example, the speed encoder 516A may generate pulses representative of the rotational speed of the motor 512A and pass the pulses to the TCM 502 which can count the pulses over time to determine the motor's speed of rotation so that motor speed can be used, along with other information, to determine the state of function of the vehicle 10.

The right drive system 501B operates in a similar manner and includes a motor 512B, a control signal 503B, a brake 514B, a speed encoder 516B, mechanical linkages 511B including the gearbox 510B and the drive wheel 508B.

Figure 6:
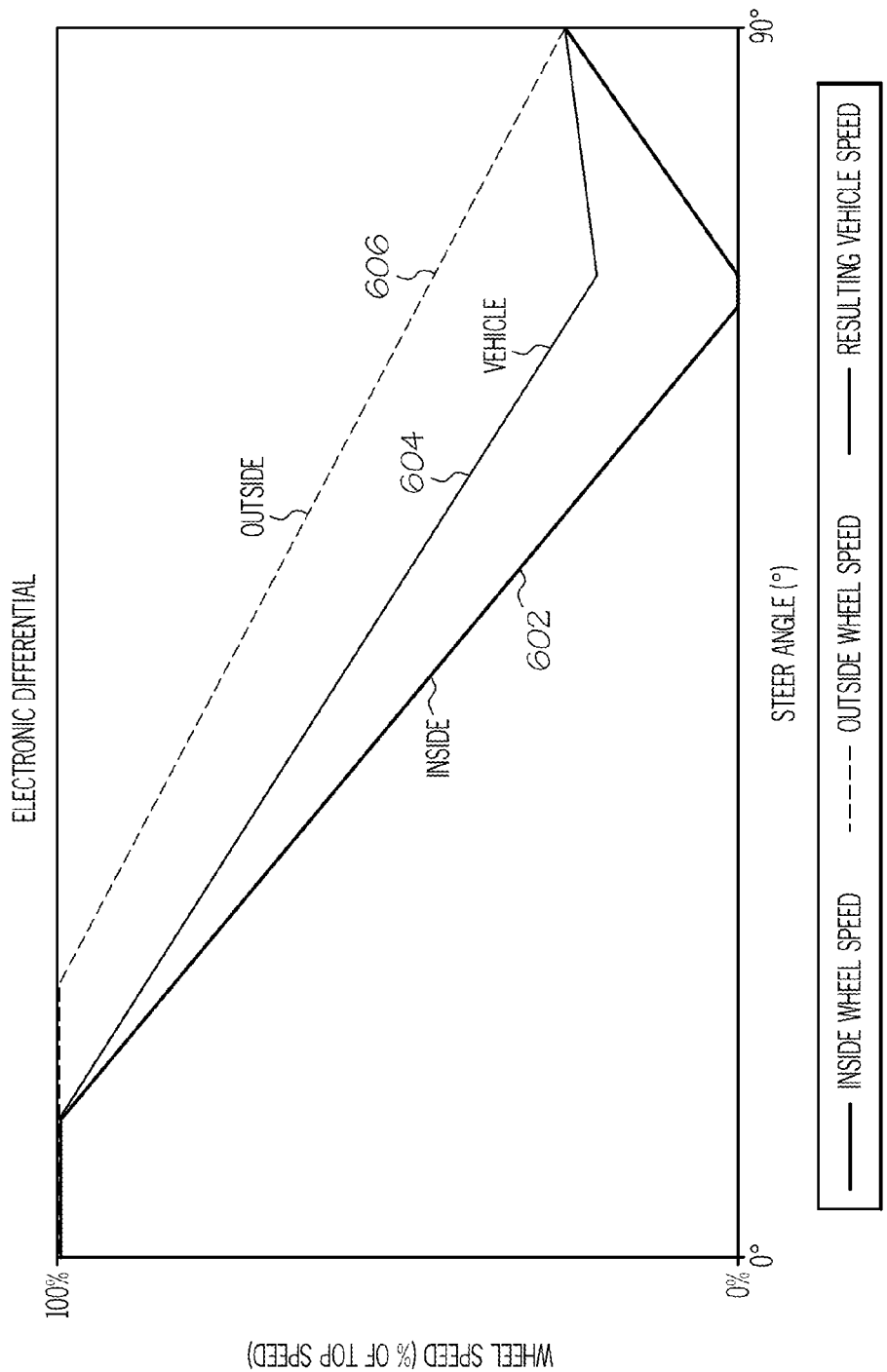
FIG. 6 illustrates a relationship between the rotational speed of an inside tire, an outside tire, and a materials handling vehicle during turns of different angles.

FIG. 6 illustrates a relationship model between the rotational speed or gearbox speed of an inside wheel 602 and the rotational speed or gearbox speed of an outside wheel 606, and a resulting speed 604 of a materials handling vehicle during turns of various steer angles (x-axis) to define an electronic differential. The TCM 502 uses the relationship model of FIG. 6 to generate traction motor speed control signals to control the wheels as if they were interconnected through a mechanical differential, hence forming a simulated or electronic differential. The TCM 502 can also compare actual speeds of an inside wheel and an outside wheel with values expected from the relationship model of FIG. 6 to determine if the wheel speeds vary substantially from the expected values depicted in FIG. 6.

Figure 7:
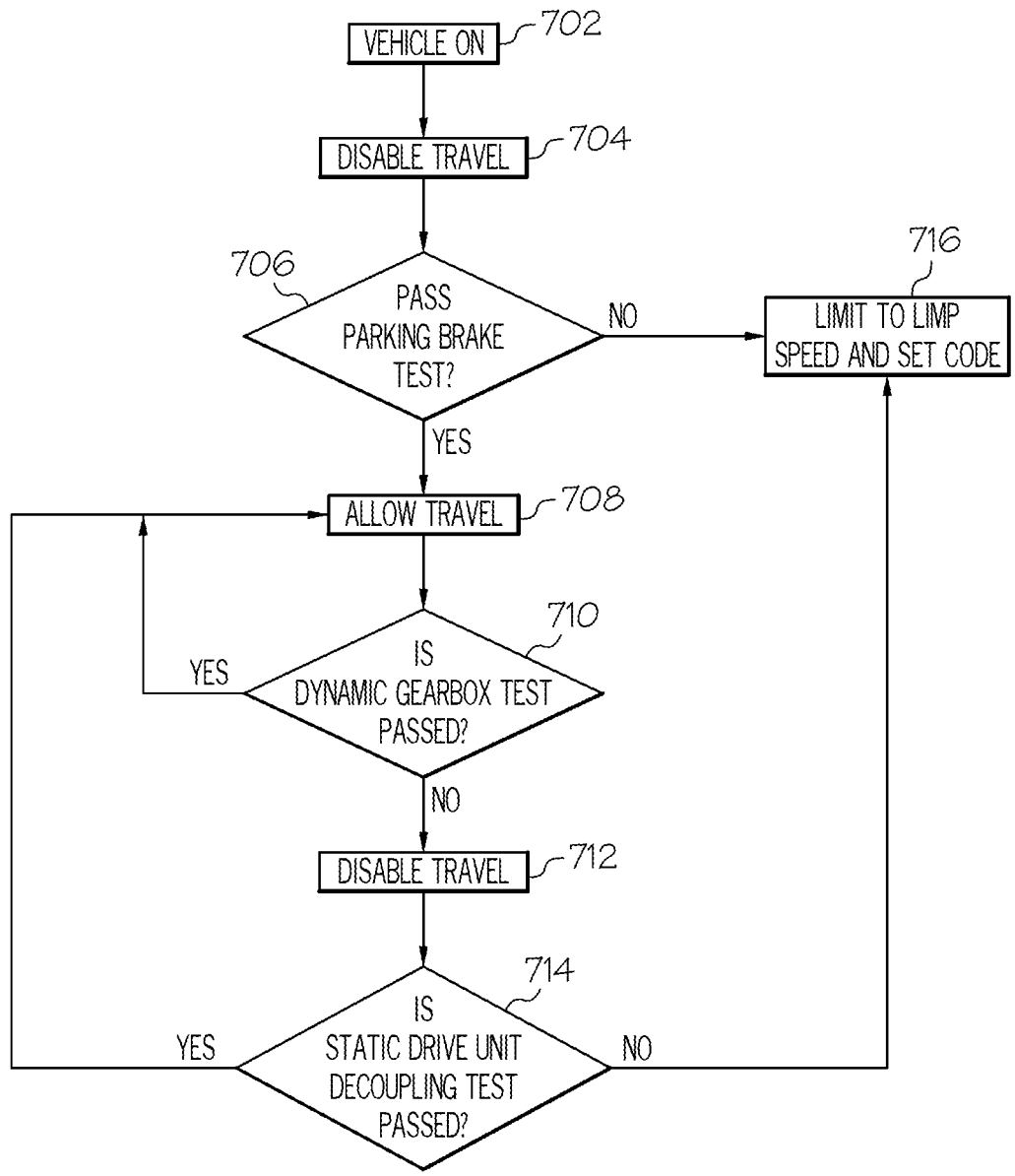
FIG. 7 is a flowchart of an exemplary process for monitoring the drivetrain integrity of a materials handling vehicle in accordance with principles of the present application.

FIG. 7 is a flowchart of an exemplary process for monitoring the drivetrain integrity of a materials handling vehicle in accordance with the principles of the present application. In step 702, an operator can key on a materials handling vehicle to provide power to the vehicle including an onboard controller (e.g., the DCM 506). The vehicle is initially prevented from traveling in step 704. While the vehicle is disabled from traveling, the DCM 506 can inform the operator that a test of the parking brake is underway: however, in a working embodiment, the test was seamlessly applied with no operator notification. The operator can be informed to perform certain functions such as to center the vehicle steering and to avoid pressing the brake pedal. Once the steering is substantially centered and the brake pedal is not engaged, a parking brake test can be performed. If the parking brake test in step 706 is passed, then travel is enabled in step 708 and the vehicle moves in accordance with the commands of the operator. If the test in step 706 is not passed, then the vehicle is put into a restricted travel mode, in step 716, the operator may be so advised and a diagnostic code may be set to help a technician readily identify the problem.

As the vehicle 10 is operated, the TCM 502 monitors its operation by performing tests referred to as dynamic gearbox tests. If the operating parameters of the vehicle 10 pass the dynamic gearbox tests, in step 710, then operation of the vehicle 10 continues to be enabled. However, once a dynamic gearbox test fails, in step 710, then travel of the vehicle is disabled, in step 712, and the vehicle will coast to a stop. Alternately, the operator can stop the vehicle by plugging or commanding a brake request. Because a dynamic gearbox test failure may be falsely triggered in some instances, a static gearbox test is performed to either confirm the dynamic gearbox test failure or to clear the dynamic gearbox test failure. Thus, in step 714, if the static gearbox test is passed, then travel is once again enabled for the vehicle 10, in step 708. However, if the static gearbox test also fails, in step 714, then the vehicle 10 is placed in a restricted travel mode and a diagnostic code may be set to indicate the nature of the failure.

Some or all of an electric vehicle's service braking requirements can be performed by regenerative braking which utilizes the traction system's ability to convert the vehicle's kinetic energy into electrical energy and then store that energy in a capacitive device, such as a battery, allowing it to later be used for operation of the vehicle.

Regenerative braking can only convert kinetic energy; therefore, it is necessary to also provide a means of holding the vehicle stationary without power. In order to comply with regulatory standards, parking or mechanical brakes (e.g., 514A, 514B) are employed having a friction material brake interface that is capable of providing the necessary torque to hold a capacity-weighted vehicle on a grade. The parking brakes also may perform emergency or backup service braking needs in the event of inadequacy of traction system regenerative braking.

The parking brakes are designed to be a lifetime static parking brake with the ability to absorb a limited number of dynamic emergency stops. There is currently no means to directly measure the amount of available parking brake torque or have any indication that the brakes require servicing. Therefore, the only available method is to apply the brakes from a known speed and measure the stopping distance. Obviously, every test will result in destructive wear to the friction material and result in a reduced brake life depending on the number of tests, vehicle weights, speeds at which the test is performed and the like.

Figure 8:
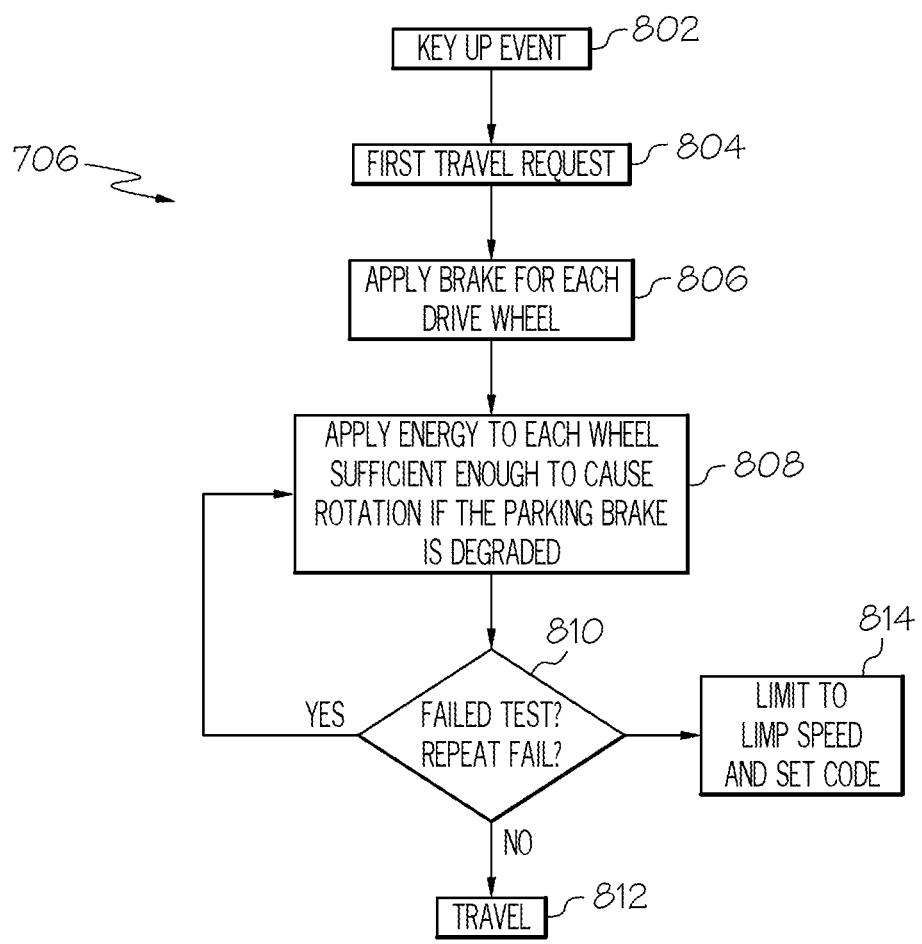
FIG. 8 is a flowchart of a process for testing a state of function of a parking brake of a materials handling vehicle in accordance with principles of the present application.

In accordance with the principles of the present application, a parking brake test provides an indication of the condition of the parking brake(s) of a materials handling vehicle. FIG. 8 is a flowchart of a process for testing a state of function of a parking brake of a materials handling vehicle in accordance with the principles of the present application.

At every key up event 802, before the vehicle is allowed to travel, a static parking brake test will be performed in accordance with the process illustrated in FIG. 8. Upon receiving the operator's first travel request, in step 804, a controller, such as the TCM 502 or the DCM 506, initiates the test. Each mechanical brake that is attached to a traction motor or a driving wheel is applied, in step 806. Once the mechanical brakes are applied, the traction motors are individually controlled such that each motor is provided sufficient power to produce enough torque to cause the motor to rotate if the brake for their respective drive wheel is functionally degraded. The amount of torque to be applied by the traction motor is determined based on the type of materials handling vehicle and will be different based on the weight and load ratings for each type of vehicle. For example, the amount of motor torque may relate to an amount of braking torque required to hold the vehicle, when carrying a maximum load, on a predetermined grade. The predetermined amount of torque each traction motor will apply to its drive wheel and therefore its mechanical brake during the test can be stored in memory accessible by the controller (e.g., TCM 502 or DCM 506). The torque will be applied in the direction of the operator's travel request, so that any movement of the vehicle due to inadequate mechanical braking will not be unexpected by the operator.

It is beneficial to test all the traction motors and their respective parking brakes that are present on the vehicle. However, testing them individually, in a sequential manner, will allow for simple isolation of which parking brake(s) has deteriorated. If the application of the designated amount of torque results in movement of the traction motor, then the parking brake test is considered to have failed. In step 810, rotation of the traction motor is detected and a record of the test failure is made. The test of step 808 is then repeated as a way to verify failure did occur. If, in step 810, it is determined that the parking brake test has failed twice, then the vehicle, in step 814, is placed in restricted operating mode and a failure/diagnostic code is generated and stored for future troubleshooting. If, in step 810, it is determined that the parking brake test has succeeded, on the first or subsequent testing, then travel of the vehicle 10 is allowed, in step 812. Rotation of the traction motor can be detected, for example, by one of the speed feedback encoders 516A, 516B described earlier. Also, rotation of the wheels 508A, 508B could be detected by other sensors available on the vehicle in order to determine the parking brake test results. It is noted that there may be a small amount of movement that occurs as the mechanical linkages of the drivetrain engage one another. Thus, a minimum threshold value may be set so that only rotation greater than that threshold results in a test failure.

The results of the testing can be obscured if the vehicle has a steer angle greater than about 20° from center or if operator braking is requested. If either of these vehicle conditions is detected, the DCM 506 can be used to prompt the operator to correct those vehicle conditions before the test of step 808 is performed (or repeated). In the restricted travel mode, the vehicle can be driven to a service location or to a new location in a building. A new location may provide a different test result as the grade or floor conditions could also possibly cause a false failure.

Returning briefly to the flowchart of FIG. 7, if the parking brake test passes, then the vehicle is permitted to travel and during operation will periodically undergo a dynamic gearbox test designed, in accordance with the principles of the present application, to detect failures or other degraded conditions in the drivetrain(s) of the vehicle.

Figure 9:
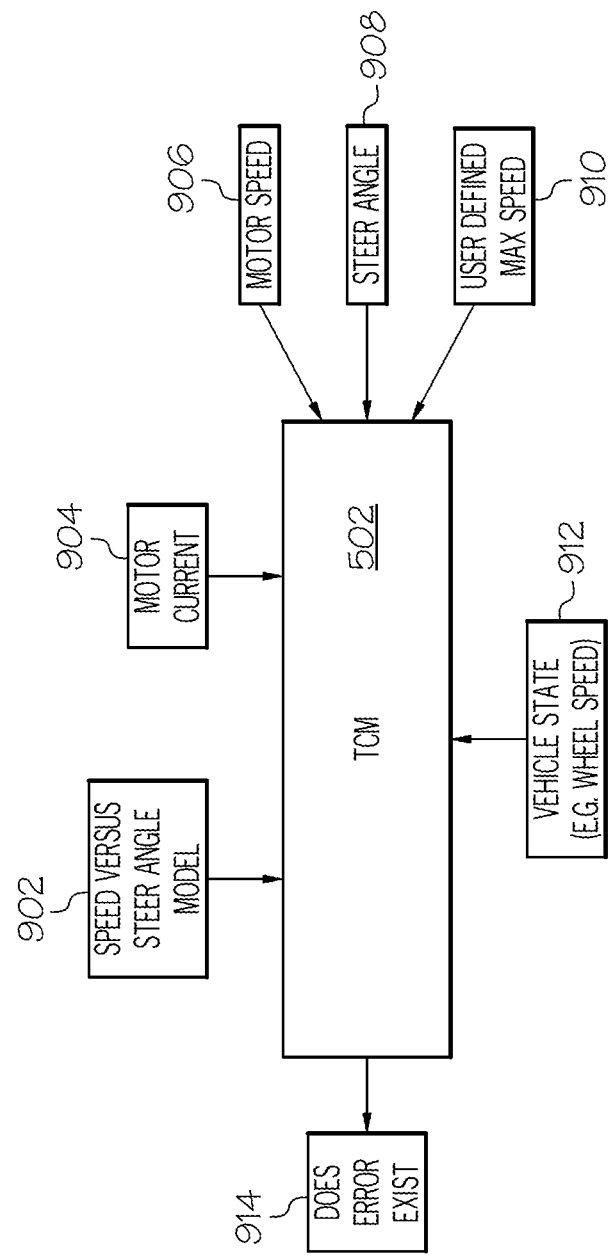
FIG. 9 illustrates a conceptual view of the inputs and outputs of a dynamic testing system and method in accordance with principles of the present application.

As mentioned above, under dynamic operating conditions it would be beneficial to be able to deductively determine the state or condition of an industrial materials handling vehicle's drivetrain, and to detect decoupling of any of the vehicle's drivetrain components (e.g., gearbox, wheel, friction brake, driving shafts, splines, etc.) between the traction motor and the drive wheels. However, falsely detecting a failure when none is actually present will adversely impact the usability of the vehicle and cause inefficiency and other problems. Thus, any dynamic test should be able to discriminate between an actual loss of function caused by mechanical failure, and an anomalous external event such as, for example, a wheel lifting from the ground, or tire-spin caused by driving on an icy or otherwise slippery surface. In the event of a malfunction, the vehicle should provide a timely alert to the operator, coast to zero velocity (alternately, the operator can bring the vehicle to a stop by either plugging or commanding a brake request), and perform additional, more-definitive tests to further determine the true operational status of the vehicle. FIG. 9 illustrates a conceptual view of the inputs and outputs of a dynamic testing system and method in accordance with the principles of the present application.

The TCM 502 has a number of inputs, information, and sensed data that relate to the operating characteristics of the vehicle. For example, the speed vs. steer angle model illustrated in FIG. 6 provides information about how respective speeds of the inside and outside wheels should relate to one another based on the current steering angle and travel conditions. A value representing the current 904 being drawn by each traction motor (e.g., 512A, 512B) is available as is the traction motor speed 906 and the vehicle's steer angle 908. Some vehicles allow a speed limit 910 to be set such that even though the vehicle is capable of traveling faster than the speed limit 910, it is prevented from doing so. In addition, the TCM 502 can be connected to the communications link 504, commonly a CAN bus, of the vehicle such that the operating state 912 of the vehicle's various components can be determined as well. Based on various combinations of these inputs, the TCM 502 can determine if some type of drivetrain failure or malfunction has occurred. Such malfunctions or failures, for example can include: a stripped spline, a broken/stripped hub, a broken axle, a gearbox state of function, the motor state of function, the parking brake state of function, wheel spin, wheel lift, and de-coupled interconnecting shafts/splines/joints.

Figure 10:
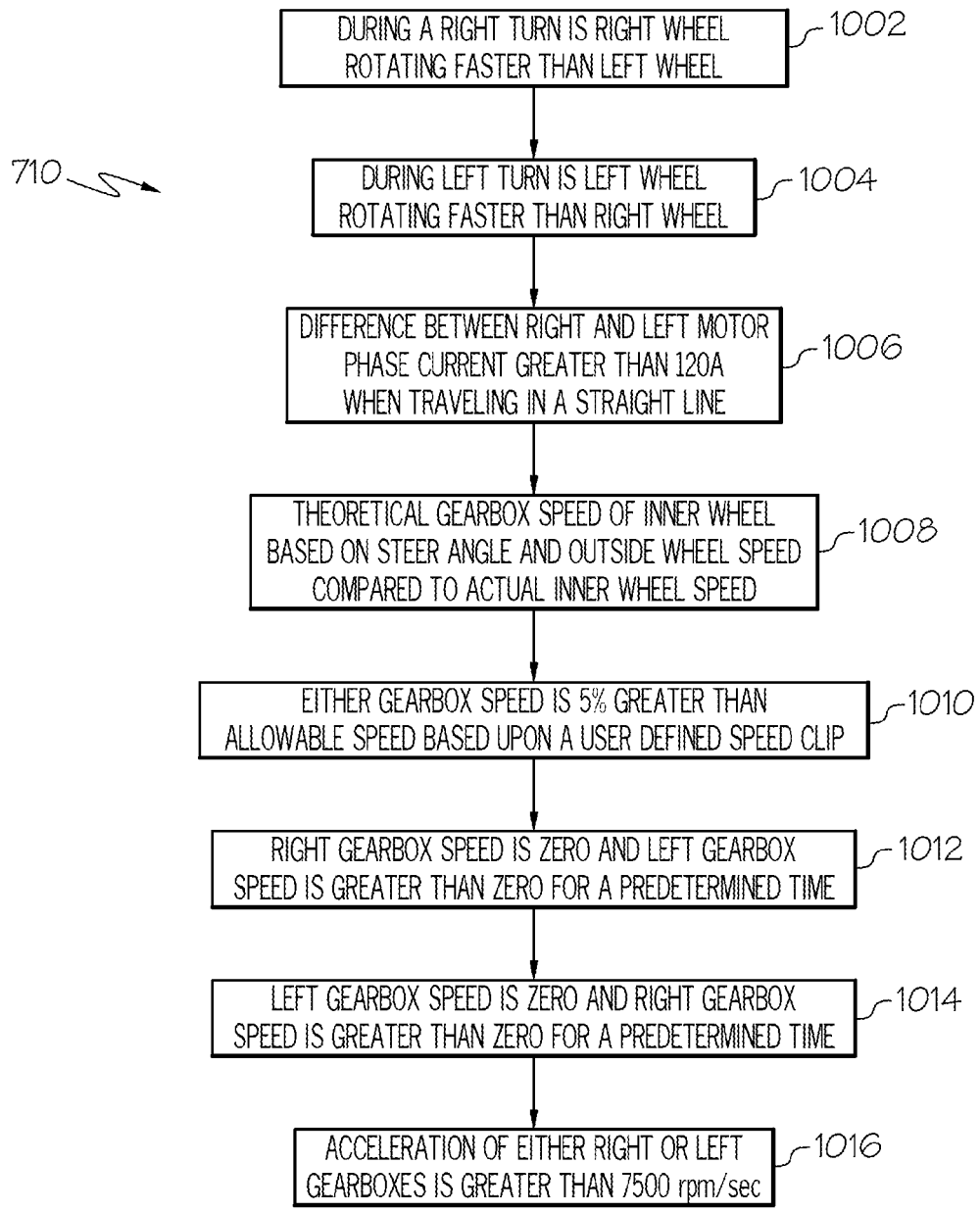
FIG. 10 is a flowchart of the details of one exemplary process to implement a dynamic testing system and method in accordance with principles of the present application.

FIG. 10 provides a flowchart of the details of one exemplary process to implement a dynamic testing system and method in accordance with the principles of the present application. The boxes of FIG. 10 represent different states of the vehicle based on measured parameters of the vehicle and/or expected values of parameters of the vehicle, the occurrence of which allows an inference to be drawn that a dynamic drivetrain failure or malfunction has occurred. Advantages of this type of heuristic approach to detecting problems is that the amount of sensors, instrumentation, transducers, etc. is minimized and relatively complex, or high levels, of computing power is not needed. The observed states of FIG. 10 are shown sequentially but this is simply to provide a framework to discuss the different inferences. Each of these observed states can be determined and evaluated in parallel or in a different order without departing from the intended scope of the principals of the present application.

The first observed state or condition 1002 is whether or not during a right turn the right wheel 508B is rotating faster than the left wheel 508A. In right turns, the speed of the right wheel should be slower than the speed of the left wheel because the right wheel is the inside wheel. Thus, observing the right wheel having a faster speed than the left wheel in a right turn raises a concern that there may be a malfunction in the system of mechanical linkages 511B including the gearbox 510B making up the right drive system 501B. To prevent some false failure indications, the results of this test can be ignored if the steer angle is greater than about 85° or if either traction motor speed is less than about 600 rpms. While the speed of the wheels can be measured directly, the speeds of the gearboxes can also be used as can the speeds of the traction motors. In accordance with a working embodiment of monitoring system of the present application, the rotational speed of a traction motors 512A, 512B as determined by their respective speed feedback encoders 516A, 516B was used rather than a directly measured gearbox speed or wheel speed.

The second observed state or condition 1004 of FIG. 10 is a mirror-image of 1002 so that it involves a left turn and hence determines whether the left wheel speed is greater than the right wheel speed.

Another condition 1006 that might lead to an inference that a dynamic drivetrain problem has occurred is that the difference between the respective motor torques, represented as control currents in a working embodiment in accordance with the teachings of the present application, to the right traction motor 512B and the left traction motor 512A is greater than some threshold amount (e.g., 120A) when the vehicle 10 is driving in an approximately straight direction. If the vehicle 10 is in the course of a turn having a steer angle greater than about 10°, then the currents to the traction motors will vary and the current comparisons are likely not to produce accurate results at such steer angles. However, when the vehicle is traveling in a relatively straight path, the respective traction motor torques and therefore currents should be similar to one another if the drivetrain on each side is functioning properly. Also, the condition 1006 evaluation may have a time component as well in order to ignore transient spikes and surges. For example, the difference between the two traction motor currents may need to be greater than some threshold for at least a predetermined time period (e.g., 120A for 0.5 sec) before a potential drivetrain problem is considered to have been detected. Also, since qualifying traction motor current differences can occur with no drivetrain problems when either traction motor speed is less than 600 rpms, such current differences when one or both motor speeds are below 600 rpms can be ignored, if desired.

Condition 1008 involves a comparison of the actual speed of the inner wheel as compared to the expected gearbox speed as determined from the electronic differential of FIG. 6. In particular, the outside wheel speed and the steer angle can be used with the model of FIG. 6 to identify an expected inner wheel speed. If the observed inner wheel speed is greater than the speed expected from the model of FIG. 6, then an inference can be drawn that there is a problem with the inner drivetrain. To avoid false failure indications, occurrences of this condition that happen when either traction motor speed is less than 600 rpms can be ignored, if desired.

Condition 1010 detects if either gearbox speed is greater than a user set speed limit. To avoid false positive test results, the observed gearbox speed might need to exceed the allowed speed by about 5% before a failure is inferred. In the absence of a user set speed limit, a vehicle may have a default speed limit set that could be used for testing this condition as well.

Another observed condition 1012 that may indicate a dynamic gearbox failure is if the right gearbox speed is zero and the left gearbox speed is greater than zero for a predetermined time period (e.g., 1.5 sec). Because this condition may occasionally occur during certain turning operations, the results of this test can be ignored, or performing this test can be avoided altogether, when the steer angle is between about +65° and +75° or between about −65° and −75°. The observation of this condition implies that there may be a drivetrain failure in the left drive system 501A. The condition represented in box 1014 is a mirror-image of condition 1012 but considers whether the left gearbox speed is zero while the right gearbox speed is greater than zero in order to determine that the problem may be in the right drive system 501B. In either test, the range of excluded steer angles is the same in order to avoid false failure indications.

The last condition 1016 detects if the acceleration of either gearbox is greater than a predetermined threshold (e.g., 7500 rpm/sec). An uncharacteristically large acceleration rate may imply that the traction motor is somehow unconnected to the other components of the drivetrain and thus a failure can be inferred.

If none of the conditions of FIG. 10 are observed, then the vehicle remains in travel mode, see step 708 of FIG. 7. If, however, a failure is inferred from one of the observed conditions, then the vehicle can be placed in a restricted travel mode so that one or more static tests can be performed to either confirm or clear the detected dynamic gearbox failure.

Many "normal" operating conditions for industrial materials handling vehicles may look like one of the conditions of FIG. 10 which would imply decoupling of an element within one or the other of the drivetrains in a dual drive system. For example, driving through wet or icy floor conditions could satisfy one or more of the conditions monitored in FIG. 10. Occurrences of false failure conditions would be detected as failures and result in disabling a vehicle and cause operator dissatisfaction. To reduce these occurrences, after a possible drivetrain failure has been detected, another test can be performed to either confirm the failure or to discredit the failed dynamic test result.

For example, once the vehicle fails a dynamic gearbox test, a fault will be issued and the drivetrain of the vehicle will be controlled so that the vehicle will coast to zero speed. The operator can alternatively bring the vehicle to a stop by either plugging or commanding a brake request. While some diagnostic codes may be cleared by powering the vehicle 10 off and then on, a dynamic decoupling fault codes can only be cleared by successfully passing the static gearbox test.

Figure 11:
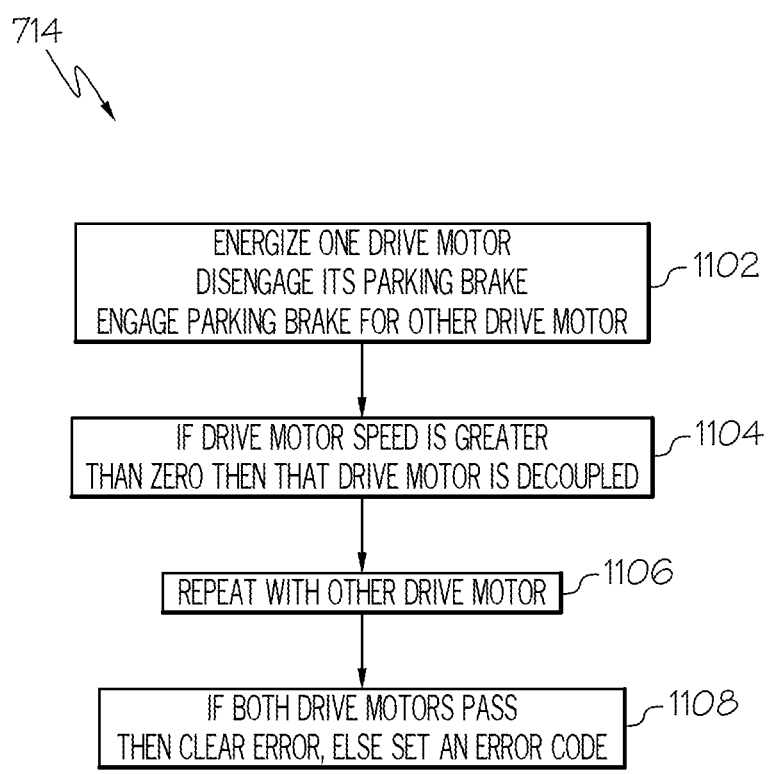
FIG. 11 is a flowchart of the details of a static test in accordance with principles of the present application.

A static test in accordance with the principles of the present application, as illustrated in the flowchart of FIG. 11, is performed individually on each of the different traction motors. In braking systems such as described above with respect to U.S. Pat. No. 7,681,963, the test can first be applied to the side of the truck that has the lower amount of mechanical braking force available (e.g., ⅓ of the total braking force). Since this test provides reliable results when the steer angle is less than about 20°, an operator can be instructed to straighten the steer angle to an acceptable level before or during the test.

In step 1102, one of the traction motors (e.g., 512A, 512B) is energized to produce enough torque that it will spin if it happens to be decoupled from its drive wheel (e.g., 508A, 508B). The respective parking brake (e.g., 514A, 514B) is released for this traction motor so that it does not prevent the motor from rotating. However, the parking brake for the other side of the truck is engaged.

If the traction motor being energized is coupled to its drive wheel, then the traction motor will not rotate because the other side's parking brake is preventing movement of the vehicle. Thus, if no mechanical decoupling failure has actually occurred, then the detected rotational speed of the traction motor will be zero. If however, in step 1104, it is determined that the traction motor speed is greater than zero, then it indicates that the traction motor has been decoupled from its drive wheel because the traction motor is rotating but the vehicle is not moving. The test procedures of steps 1102 and 1104 are then repeated, in step 1106, for the other traction motor. In step 1108, if both traction motors pass the static gearbox test, then the dynamic gearbox failure code is cleared and the vehicle 10 is once again enabled for operation. However, if either static gearbox test fails, then an appropriate code is set and the vehicle remains in restricted travel mode.

As mentioned briefly with respect to the parking brake test, the linkages and traction motor shafts may allow for limited movement as the different components engage one another. Thus, some small amount of movement can be observed even if the traction motor is coupled with its drive wheel. Accordingly, the rate and number of samples collected regarding the rotation of the traction motor can be selected to reduce false failures. Also, the rate at which the current is applied can be selected to increase torque quickly (e.g., produce the desired torque in less than 15 msec.) in order to more easily detect movement if it were to occur.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of dynamically monitoring one or more drivetrains of an industrial vehicle, comprising:
    observing a plurality of operating parameters of the industrial vehicle while it is being operated;
    determining whether a drivetrain failure has occurred using the operating parameters;
    performing, if a drivetrain failure is detected, a static test on the industrial vehicle to confirm the dynamic drivetrain failure, the static test being performed while the industrial vehicle is not moving;
    based on results of the static test, determining either that a static test failure occurred or a static test failure has not occurred; and
    restricting drive capabilities of the industrial vehicle if the static test failure occurred.

2. The method of claim 1, wherein determining whether a drivetrain failure has occurred comprises determining whether during a right turn a right traction motor is rotating faster than a left traction motor.

3. The method of claim 1, wherein determining whether a drivetrain failure has occurred comprises determining whether during a left turn a left traction motor is rotating faster than a right traction motor.

4. The method of claim 1, wherein determining whether a drivetrain failure has occurred comprises detecting whether a difference between a first current drawn by a left traction motor and a second current drawn by a right traction motor is greater than a predetermined threshold.

5. The method of claim 4, further comprising detecting that a steer angle is between about±10°.

6. The method of claim 1, wherein determining whether a drivetrain failure has occurred comprises:
    determining an expected speed of an inside traction motor based on a detected steer angle and a detected speed of an outside traction motor; and
    determining if an actual speed of the inside traction motor is greater than the expected speed.

7. The method of claim 1, wherein determining whether a drivetrain failure has occurred comprises:
    identifying a speed limit for the industrial vehicle; and
    determining if a respective speed of either a right traction motor or a left traction motor exceeds the speed limit.

8. The method of claim 1, wherein determining whether a drivetrain failure has occurred comprises:
    determining if a respective speed of one of a left or right traction motor is zero while the other of the right or left traction motor has a respective speed greater than zero.

9. The method of claim 1, wherein determining whether a drivetrain failure has occurred comprises:
    determining if a respective acceleration rate of either a right traction motor or a left traction motor exceeds a predetermined threshold.

10. An industrial vehicle comprising:
    a power unit;
    at least one drive wheel;
    at least one traction motor;
    at least one drivetrain between the at least one drive wheel and the at least one traction motor;

at least one mechanical brake for transmitting braking forces to the at least one wheel; and a controller module to execute program instructions to:

observe a plurality of operating parameters of the industrial vehicle while it is being operated;

determine whether a drivetrain failure has occurred using the operating parameters;

perform, if a drivetrain failure is detected, a static test on the industrial vehicle to confirm the dynamic drivetrain failure, the static test being performed while the industrial vehicle is not moving;

based on results of the static test, determine either that a static test failure occurred or a static test failure has not occurred; and restrict drive capabilities of the industrial vehicle if the static test failure occurred.

11. The industrial vehicle of claim 10, further comprising at least one feedback encoder to monitor the rotational speed of the at least one traction motor.

12. The industrial vehicle of claim 11, wherein determining whether a drivetrain failure has occurred comprises determining whether during a right turn a right traction motor is rotating faster than a left traction motor.

13. The industrial vehicle of claim 11, wherein determining whether a drivetrain failure has occurred comprises:

determining an expected speed of an inside traction motor based on a detected steer angle and a detected speed of an outside traction motor; and determining if an actual speed of the inside traction motor is greater than the expected speed.

14. The industrial vehicle of claim 11, wherein determining whether a drivetrain failure has occurred comprises:

identifying a speed limit for the industrial vehicle; and determining if a speed of the at least one traction motor exceeds the speed limit.

15. The industrial vehicle of claim 11, wherein determining whether a drivetrain failure has occurred comprises:

determining if a respective speed of one of a left or right traction motor is zero while the other of the right or left traction motor has a respective speed greater than zero.

16. The industrial vehicle of claim 11, wherein determining whether a drivetrain failure has occurred comprises:

determining if a respective acceleration rate of either a right traction motor or a left traction motor exceeds a predetermined threshold.

17. A method of dynamically monitoring one or more drivetrains of an industrial vehicle, comprising:

observing a plurality of operating parameters of the industrial vehicle while it is being operated;

determining if a dynamic gearbox test failure has occurred based on one or more of the plurality of operating parameters;

performing a static test on the industrial vehicle to confirm the dynamic gearbox test failure, the static test being performed while the industrial vehicle is not moving;

based on results of the static test, determining either that a static test failure occurred or a static test failure has not occurred; and restricting drive capabilities of the industrial vehicle if the static test failure occurred.

18. The method of claim 17, wherein determining if a dynamic gearbox test failure has occurred comprises determining if during a right turn a right traction motor is rotating faster than a left traction motor.

19. The method of claim 17, wherein determining if a dynamic gearbox test failure has occurred comprises determining if during a left turn a left traction motor is rotating faster than a right traction motor.

20. The method of claim 17, wherein determining if a dynamic gearbox test failure has occurred comprises detecting if a difference between a first current drawn by a left traction motor and a second current drawn by a right traction motor is greater than a predetermined threshold.

21. The method of claim 20, further comprising:

detecting that a steer angle is between about ±10°.

22. The method of claim 17, wherein determining if a dynamic gearbox test failure has occurred comprises:

determining an expected speed of an inside traction motor based on a detected steer angle and a detected speed of an outside traction motor; and determining if an actual speed of the inside traction motor is greater than the expected speed.

23. The method of claim 17, wherein determining if a dynamic gearbox test failure has occurred comprises:

identifying a speed limit for the industrial vehicle; and determining if a respective speed of either a right traction motor or a left traction motor exceeds the speed limit.

24. The method of claim 17, wherein determining if a dynamic gearbox test failure has occurred comprises determining if a respective speed of one of a left or right traction motor is zero while the other of the right or left traction motor has a respective speed greater than zero.

25. The method of claim 17, wherein determining if a dynamic gearbox test failure has occurred comprises determining if a respective acceleration rate of either a right traction motor or a left traction motor exceeds a predetermined threshold.

26. The method of claim 17, wherein the static test comprises:

disengaging a first friction brake associated with the first traction motor;

engaging a second friction brake associated with a second traction motor;

energizing the first traction motor to produce a first torque at a first predetermined value, wherein the first torque is sufficient to rotate the first traction motor if the first traction motor is decoupled from the first gearbox;

detecting if the first traction motor rotates as a result of the first torque; and determining the static test failure has occurred when rotation of the first traction motor occurs.

27. The method of claim 26, further comprising:

disengaging the second friction brake;

engaging the first friction brake;

energizing the second traction motor to produce a second torque at a second predetermined value, wherein the second torque is sufficient to rotate the second traction motor if the second traction motor is decoupled from a second gearbox;

detecting if the second traction motor rotates as a result of the second torque; and determining the static test failure has occurred when rotation of the second traction motor occurs.

28. A method of dynamically monitoring one or more drivetrains of an industrial vehicle, comprising:

observing a plurality of operating parameters a right traction motor and a left traction motor of the industrial vehicle while it is being operated; and determining whether a drivetrain failure has occurred using the operating parameters.

29. The method of claim 28, wherein determining whether a drivetrain failure has occurred comprises determining whether during a right turn the right traction motor is rotating faster than the left traction motor.

30. The method of claim 28, wherein determining whether a drivetrain failure has occurred comprises determining whether during a left turn the left traction motor is rotating faster than the right traction motor.

31. The method of claim 28, wherein determining whether a drivetrain failure has occurred comprises detecting whether a difference between a first current drawn by the left traction motor and a second current drawn by the right traction motor is greater than a predetermined threshold.

32. The method of claim 31, further comprising detecting that a steer angle is between about±10°.

33. A method of dynamically monitoring one or more drivetrains of an industrial vehicle, comprising:
   observing a plurality of operating parameters of an inside traction motor and an outside traction motor of the industrial vehicle while it is being operated; and
   determining whether a drivetrain failure has occurred using the operating parameters, wherein determining whether a drivetrain failure has occurred comprises:
      determining an expected speed of the inside traction motor based on a detected steer angle and a detected speed of the outside traction motor; and
      determining if an actual speed of the inside traction motor is greater than the expected speed.

34. The method of claim 28, wherein determining whether a drivetrain failure has occurred comprises:
   identifying a speed limit for the industrial vehicle; and
   determining if a respective speed of either the right traction motor or the left traction motor exceeds the speed limit.

35. The method of claim 28, wherein determining whether a drivetrain failure has occurred comprises:
   determining if a respective speed of one of the left or right traction motor is zero while the other of the right or left traction motor has a respective speed greater than zero.

36. The method of claim 28, wherein determining whether a drivetrain failure has occurred comprises:
   determining if a respective acceleration rate of either the right traction motor or the left traction motor exceeds a predetermined threshold.

\* \* \* \* \*

UNITED STATES PATENT AND TRADEMARK OFFICE
CERTIFICATE OF CORRECTION

PATENT NO.       : 8,886,378 B2
APPLICATION NO.  : 13/747645
DATED            : November 11, 2014
INVENTOR(S)      : Joe K. Hammer, Michael P. Kovach and Ronald L. Ziegler Page 1 of 1

It is certified that error appears in the above-identified patent and that said Letters Patent is hereby corrected as shown below:

In the Claims:

Col. 16, line 61, Claim 28, "observing a plurality of operating parameters a right" should read --observing a plurality of operating parameters of a right--

Signed and Sealed this
Twenty-fourth Day of February, 2015

Michelle K. Lee
*Deputy Director of the United States Patent and Trademark Office*